(12) United States Patent
Kim et al.

(10) Patent No.: US 10,075,691 B2
(45) Date of Patent: Sep. 11, 2018

(54) MULTIVIEW VIDEO CODING METHOD USING NON-REFERENCED VIEW VIDEO GROUP

(71) Applicant: UNIVERSITY-INDUSTRY COOPERATION GROUP OF KYUNG-HEE UNIVERSITY, Yongin-si, Gyeonggi-Do (KR)

(72) Inventors: JinSang Kim, Yongin-si (KR); MinSu Choi, Suwon-si (KR); IkJoon Chang, Seoul (KR)

(73) Assignee: UNIVERSITY-INDUSTRY COOPERATION GROUP OF KYUNG-HEE UNIVERSITY, Yongin-si, Gyeonggi-Do (KR)

(*) Notice: Subject to any disclaimer, the term of this patent is extended or adjusted under 35 U.S.C. 154(b) by 320 days.

(21) Appl. No.: 14/966,451

(22) Filed: Dec. 11, 2015

(65) Prior Publication Data

US 2016/0173854 A1    Jun. 16, 2016

(30) Foreign Application Priority Data

Dec. 11, 2014  (KR) ........................ 10-2014-0178435

(51) Int. Cl.
*H04N 19/597* (2014.01)
*H04N 19/105* (2014.01)
(Continued)

(52) U.S. Cl.
CPC ....... *H04N 13/0048* (2013.01); *H04N 19/105* (2014.11); *H04N 19/15* (2014.11);
(Continued)

(58) Field of Classification Search
CPC ............. H04N 13/0048; H04N 19/577; H04N 19/597; H04N 19/105; H04N 19/15; H04N 19/172; H04N 19/177; H04N 19/184
(Continued)

(56) References Cited

U.S. PATENT DOCUMENTS

| | | | |
|---|---|---|---|
| 2007/0041443 A1* | 2/2007 | Ha ................... | H04N 13/0059 375/240.15 |
| 2007/0211796 A1* | 9/2007 | Kim ................. | H04N 19/00 375/240.01 |

FOREIGN PATENT DOCUMENTS

| KR | 20130063995 A | * | 6/2013 |
| KR | 10-1383486 B1 | | 4/2014 |

OTHER PUBLICATIONS

Xiu et al., Rectification-Based View Interpolation and Extrapolation for Multiview Video Coding, 2011, IEEE Transactions on Circuits and Systems for Video Technology, pp. 693-707.*
(Continued)

*Primary Examiner* — Behrooz Senfi
*Assistant Examiner* — Kathleen Walsh
(74) *Attorney, Agent, or Firm* — Rabin & Berdo, P.C.

(57) ABSTRACT

A multiview video coding method and device used in coding of non-referenced view video groups. A view compensation pattern and a parallelization view pattern are determined based on video characteristics, such as the number of bits of each frame of a first non-referenced view video group among the non-referenced view video groups, the difference between the number of bits of each frame and the number of bits of a left reference view image, the difference between the number of bits of each frame and the number of bits of a right reference view image. A view compensation pattern and a parallelization view pattern of a successive non-referenced view video group are determined as the view
(Continued)

compensation pattern and the parallelization view pattern of the first non-referenced view video group, whereby multi-view video images are coded at a high coding rate without deteriorating image quality.

17 Claims, 8 Drawing Sheets

(51) Int. Cl.
    *H04N 19/15*     (2014.01)
    *H04N 19/177*     (2014.01)
    *H04N 19/577*     (2014.01)
    *H04N 13/00*     (2018.01)

(52) U.S. Cl.
    CPC ......... *H04N 19/177* (2014.11); *H04N 19/577* (2014.11); *H04N 19/597* (2014.11)

(58) Field of Classification Search
    USPC ........................................ 348/43; 375/240.01
    See application file for complete search history.

(56) References Cited

OTHER PUBLICATIONS

Jie Liang et al., "Rectification-Based View Interpolation and Extrapolation for Multiview Video Coding", IEEE Transactions on Circuits and Systems for Video Technology, vol. 21, No. 6, Jun. 2011.

\* cited by examiner

MULTIVIEW VIDEO CODING METHOD USING NON-REFERENCED VIEW VIDEO GROUP

CROSS REFERENCE TO RELATED APPLICATION

The present application claims priority from Korean Patent Application Number 10-2014-178435 filed on Dec. 11, 2014, the entire contents of which are incorporated herein for all purposes by this reference.

BACKGROUND

Field of the Invention

The present disclosure relates to a multiview video coding method and device. More particularly, the present disclosure relates to a multiview video coding method and device used in coding of non-referenced view video groups. The method and device can determine a view compensation pattern and a parallelization view pattern based on video characteristics, such as the number of bits occurring in each of frames of a first non-referenced view video group among the non-referenced view video groups, the difference between the number of bits of each of the frames of the first non-referenced view video group and the number of bits of a left reference view image, the difference between the number of bits of each of the frames of the first non-referenced view video group and the number of bits of a right reference view image, and can determine a view compensation pattern and a parallelization view pattern of a successive non-referenced view video group input in succession to the first non-referenced view video group as the view compensation pattern and the parallelization view pattern of the first non-referenced view video group, thereby coding multiview video images at a high coding rate without deteriorating image quality.

Description

As digital video is developing from high definition video into ultra definition video, three-dimensional (3D) video services have been introduced. The three-dimensional audio video (3DAV) group established the standard for 3D multiview video by performing new standardization of 3D audio/video technology which has been included in the standardization of the moving picture expert group (MPEG) since 2001. It is expected that in the future a variety of applications using 3D multiview video will be actively developed.

3D multiview video refers to a series of 3D images obtained using a plurality of cameras, which could not be obtained by existing imaging methods used for obtaining two-dimensional (2D) images using a single view camera. The key concept of compression coding technology including multiview video coding of 3D video is to more effectively compress and encode 3D video using not only temporal and spatial redundancy but also the redundancy between camera views.

However, the most significant problem in the compression coding technology of 3D multiview video is in performing predictable coding of the time, space, and views between images obtained using the plurality of cameras, in proportion to multiview. The coding compression of 3D multiview video performs the predictable coding of the time, space, and views between a plurality of images, which takes up 70% to 80% of overall coding compression calculations, thereby significantly increasing the overall amount of coding compression calculations.

FIG. 1 is a functional block diagram illustrating a typical multiview video compression coding method of the related art.

Referring to FIG. 1, a plurality of images S1, S2, . . . , and Sn obtained using a plurality of cameras are coded, thereby being formed as a bit stream. In a first image coding device 10 for coding a first image among the plurality of images obtained using a first camera, a motion estimator 11 estimates the motion of a current unit macro block that is input in a unit macro block size. That is, the motion estimation of a current unit macro block searches a reference frame region for a unit macro block matching the current unit macro block. A closest matching candidate macro block is selected by comparing all of, or portions of each of, available unit macro blocks within the reference frame region with the current unit macro block. Here, the sizes of the unit macro blocks are 4×4, 4×8, 8×4, 8×8, 8×16, 16×8, and 16×16.

A motion compensator 13 produces an error value by balancing the current unit macro block and the selected candidate macro block. The motion estimation and compensation is performed on the current unit macro block according to the sizes of the unit macro blocks, which are 4×4, 4×8, 8×4, 8×8, 8×16, 16×8, and 16×16. A prediction mode determiner 15 determines the coding prediction mode of each unit macro block, i.e. the size of the coding and compression of the unit macro block, based on an error value produced by performing the motion estimation and compensation on the unit macro block.

An encoder 17 performs a transform, such as a discrete cosine transform (DCT) or a wavelet transform, on the motion vectors of the error value and the unit macro value produced according to the determined coding prediction mode, and quantizes transformed data, thereby removing spatially redundant elements. The encoder 17 generates a bit stream of the first image from the motion vectors of the error block and the unit macro block through the transform and quantization. The first image coding device 10 for coding the first image obtained using the first camera generates a reference frame to be used in later image prediction by decoding the quantized data. This will not be described further since a detailed description thereof is clearly provided in the H.264 standard.

A second image coding device 20 for coding a second image among the plurality of images obtained using a second camera is generally divided into a view predicting part and a time predicting part. The view predicting part calculates an error value of the second image based on the difference in the view between the second image and the first image. The time predicting part calculates an error value of the second image based on the difference in the time between the reference frame and the current macro block of the second image through the motion compensation.

The view predicting part for the second image will be described in detail hereinafter. First, a view estimator 21 estimates a difference in the view between the unit macro block of the first image and the unit macro block of the second image, i.e. estimates the view of the unit macro block of the first image and the view of the unit macro block of the second image. The view estimator 21 searches for a unit macro block of the first image obtained using the first camera that matches a unit macro block of the second image obtained using the second camera. A view compensator 22 produces an error value by balancing the searched unit macro block of the first image and the unit macro block of the second image.

The MPEG 3-dimensional audio video (3DAV) sets standard view video and 3D audio/video technologies for the prediction between views. Studies into reducing the problems of the existing approaches of view video processing by changing the structure of a group of groups of pictures (GoGOP) are being undertaken. The GoGOP is an extensive concept of the group of pictures (GOP) representing a group of frames in a single view, and represents a group of groups of pictures according to the number of views.

The structure of the GoGOP for view video processing of the related art has an anchor structure. Since an I frame is provided in each of views and coding is independently performed according to views, the predictable coding is inefficient. In order to overcome the problems of the anchor structure, a hierarchical B picture structure was proposed. Unlike the anchor group, the GoGOP of the hierarchical B picture structure sets an I frame in the first view and allows the other views to be referred to by each other.

FIG. 2 illustrates an example of the GoGOP of the hierarchical B picture structure.

Describing FIG. 2 in greater detail, square blocks represent view frames in a view video source. A vertical arrow represents the sequence of the frames according to views or camera positions, and a horizontal arrow represents the time sequence of the frames. Arrows between the frames represent the directions of prediction, in which horizontal arrows mean the directions of predicted motions, and vertical arrows mean the directions of predicted views. I frames represent "intra-frames," which are identical to the I frames in the MPEG-2/4 or H.264 standard, and P frames and B frames represent "prediction frames" and "bidirectional prediction frames" similar to those in the MPEG-2/4 or H.264 standard.

As illustrated in FIG. 2, it is apparent that the sequences of frames in each view are formed of different frames. The 0th view S0 includes I frames and B frames, the first view S1 includes B frames and b frames, and the second view S2 includes P frames and B frames.

Korean Patent No. 10-1383486 discloses a multiview video coding method intended to reduce the amount of calculations considering that a picture group in a view including B frames or b frames is not used for prediction by the other picture groups in the GoGOP of this hierarchical B picture (frame) structure, and that a user watching multiview video actually uses only two views. Hereinafter, a picture group in a view including B frames or b frames is referred to as a non-referenced view video group. The multiview video coding method disclosed in Korean Patent No. 10-1383486 can reduce the amount of calculations used for parallelization by setting the non-referenced view video group parallel to an adjacent left reference view image or an adjacent right reference view image instead of parallelizing all frames of multiview video. It is also possible to reduce the distortion of video by setting the non-referenced view video group parallel to an adjacent reference view image.

However, in the related-art approaches as described above, there is no indication of which one of the adjacent left reference view image and the adjacent right reference view image is to be taken as a basis for parallelization or view compensation on the non-referenced view video group.

The information disclosed in the Background section is only provided for a better understanding of the background and should not be taken as an acknowledgment or any form of suggestion that this information forms prior art that would already be known to a person skilled in the art.

RELATED ART DOCUMENT

Patent Document 1: Korean Utility Model Registration No. 20-1997-024580 U

BRIEF SUMMARY

Various aspects of the present disclosure provide a method and device used in coding of non-referenced view video groups. The method and device can determine a view compensation pattern and a parallelization pattern of a left reference view image and a right reference view image at a high coding efficiency based on video characteristics, such as the number of bits occurring in each of frames of a non-referenced view video group, the difference between the number of bits of each of the frames of the non-referenced view video group and the number of bits of the left reference view image, the difference between the number of bits of each of the frames of the non-referenced view video group and the number of bits of the right reference view image.

Also provided are a method and device focused on the concept that the video characteristics of a successive non-referenced view video group input in succession to the non-referenced view video group are similar to those of the non-referenced view video group. The method and device can reduce the amount of coding calculations by coding the successive non-referenced view video according to a view compensation pattern and a parallelization pattern of the non-referenced view video group.

Also provided are a method and device able to accurately determine a view compensation pattern or a parallelization view pattern by updating the non-referenced view video group with the successive non-referenced view video group based on the number of bits occurring in a first input frame of the successive non-referenced view video group.

According to an aspect, a multiview video coding method includes: determining a parallelization view pattern and a view compensation pattern of each of frames of a first non-referenced view video group among successively-input non-referenced view video groups of multiview video; and coding a successive non-referenced view video group input in succession to the first non-referenced view video group by performing parallelization or view compensation on the successive non-referenced view video group according to the determined parallelization view pattern and the determined view compensation pattern.

The non-referenced view video groups may have a hierarchical B picture structure.

The multiview video coding method may further include, before coding the successive non-referenced view video group, determining whether or not to update the first non-referenced view video group with the successive non-referenced view video group based on a number of bits occurring in a first frame of the successive non-referenced view video group. When the first non-referenced view video group is updated with the successive non-referenced view video group, the parallelization view pattern and the view compensation pattern of each of the frames of the first non-referenced view video group are determined as and are updated with a parallelization view pattern and a view compensation pattern of each of frames of the successive non-referenced view video group.

A balanced number of bits may be obtained by balancing the number of bits occurring in the first input frame of the first non-referenced view video group and a number of bits occurring in a first input frame of the successive non-referenced view video group. When the balanced number of bits is greater than a balance threshold, the first non-referenced view video group may be updated with the successive non-referenced view video group.

The operation of determining the parallelization view pattern and the view compensation pattern of the first non-referenced view video group may include: comparing a number of bits occurring in each of frames of the first non-referenced view video group with an average number of bits occurring in the first non-referenced view video group; determining a view compensation pattern of each of the frames as a view compensation pattern of one of bidirectional view compensation and unidirectional view compensation based on a result of comparing the number of bits occurring in each of the frames with the average number of bits; and determining the parallelization view pattern of each of the frames as one of a left reference view and a right reference view based on a difference between the number of bits occurring in each of the frames and a number of bits occurring in a left reference view frame and a difference between the number of bits occurring in each of the frames and a number of bits occurring in a right reference view frame.

In the operation of determining the view compensation pattern of the first non-referenced view video group, the view compensation pattern may be determined as the view compensation pattern of the bidirectional view compensation when the number of bits occurring in a frame of the frames of the first non-referenced view video group is greater than the average number of bits.

The operation of determining the view compensation pattern of the first non-referenced view video group may includes: when the number of bits occurring in a frame of the frames of the first non-referenced view video group is not greater than the average number of bits, comparing the difference between the number of bits occurring in the frame and the number of bits occurring in the left reference view frame with the difference between the number of bits occurring in the frame and the number of bits occurring in the right reference view frame; and when the difference between the number of bits occurring in the frame and the number of bits occurring in the left reference view frame is smaller than the difference between the number of bits occurring in the frame and the number of bits occurring in the right reference view frame, comparing the difference between the number of bits occurring in the frame and the number of bits occurring in the left reference view frame with an average value of differences between the numbers of bits occurring in the frames of the first non-referenced view video group and the number of bits occurring in the left reference view frame. When the difference between the number of bits occurring in the frame and the number of bits occurring in the left reference view frame is smaller than the average value of differences between the numbers of bits occurring in the frames of the first non-referenced view video group and the number of bits occurring in the left reference view frame, the view compensation pattern is determined by setting the left reference view frame as a reference view frame of the unidirectional view compensation.

When the difference between the number of bits occurring in the frame and the number of bits occurring in the left reference view frame is not smaller than the average value of differences between the numbers of bits occurring in the frames of the first non-referenced view video group and the number of bits occurring in the left reference view frame, the view compensation pattern may be determined as the view compensation pattern of the bidirectional view compensation.

The operation of determining the view compensation pattern of the first non-referenced view video group may include: when the number of bits occurring in a frame of the frames of the first non-referenced view video group is not greater than the average number of bits, comparing the difference between the number of bits occurring in the frame and the number of bits occurring in the left reference view frame with the difference between the number of bits occurring in the frame and the number of bits occurring in the right reference view frame; and when the difference between the number of bits occurring in the frame and the number of bits occurring in the left reference view frame is not smaller than the difference between the number of bits occurring in the frame and the number of bits occurring in the right reference view frame, comparing the difference between the number of bits occurring in the frame and the number of bits occurring in the right reference view frame with an average value of differences between the numbers of bits occurring in the frames of the first non-referenced view video group and the number of bits occurring in the right reference view frame. When the difference between the number of bits occurring in the frame and the number of bits occurring in the right reference view frame is smaller than the average value of differences between the numbers of bits occurring in the frames of the first non-referenced view video group and the number of bits occurring in the right reference view frame, the view compensation pattern is determined by setting the right reference view frame as a reference view frame of the unidirectional view compensation.

When the difference between the number of bits occurring in the frame and the number of bits occurring in the right reference view frame is not smaller than the average value of differences between the numbers of bits occurring in the frames of the first non-referenced view video group and the number of bits occurring in the right reference view frame, the view compensation pattern may be determined as the view compensation pattern of the bidirectional view compensation.

The average number of bits occurring in the first non-referenced view video group may be calculated as an average number of bits obtained by performing the bidirectional view compensation on the frames of the first non-referenced view video group.

The average number of bits occurring in the first non-referenced view video group may be calculated as an average number of bits obtained by performing the bidirectional view compensation on remaining frames of the first non-referenced view video group except for a first, anchor frame.

According to another aspect, a multiview video coding method includes: selecting a reference view and a non-referenced view from multiview video; when non-referenced view video groups corresponding to the selected non-referenced view are successively input, determining a parallelization view pattern and a view compensation pattern of each of frames of a first non-referenced video group among the non-referenced view video groups; and coding a successive non-referenced view video group input in succession to the first non-referenced view video group by performing parallelization or view compensation on the successive non-referenced view video group according to the determined parallelization view pattern and the determined view compensation pattern.

According to a further aspect, a multiview video coding device includes: a pattern determiner determining a parallelization view pattern and a view compensation pattern of each of frames of a first non-referenced view video group among successively-input non-referenced view video groups of multiview video; and an encoder coding a successive non-referenced view video group input in succession to the first non-referenced view video group by performing parallelization and view compensation on the successive non-referenced view video group according to the determined parallelization view pattern and the determined view compensation pattern.

The multiview video coding device may further include a video group updater determining whether or not to update the first non-referenced view video group with the successive non-referenced view video group based on a number of bits occurring in a first frame of the successive non-referenced view video group. When the first non-referenced view video group is updated with the successive non-referenced view video group, the pattern determiner redetermines the parallelization view pattern and the view compensation pattern of each of the frames of the first non-referenced view video group.

The video group updater may calculate a balanced number of bits by balancing a number of bits occurring in a first input frame of the first non-referenced view video group and a number of bits occurring in a first input frame of the successive non-referenced view video group, and when the balanced number of bits is greater than a balance threshold, the first non-referenced view video group is updated with the successive non-referenced view video group.

The pattern determiner may include: an average bit number calculator calculating an average number of bits occurring in the frames of the first non-referenced view video group among the non-referenced view video groups; a bit number comparator comparing the number of bits occurring in each of the frames of the first non-referenced view video group and the average number of bits occurring in the first non-referenced view video group; a view compensation determiner determining a view compensation pattern of each of the frames as a view compensation pattern of one of bidirectional view compensation and unidirectional view compensation based on a result of comparison between the number of bits occurring in each of the frames and the average number of bits; and a parallelization view determiner determining the parallelization view pattern of each of the frames as one of left reference view and right reference view based on a difference between the number of bits occurring in each of the frames and a number of bits occurring in a left reference view frame and a difference between the number of bits occurring in each of the frames and a number of bits occurring in a right reference view frame.

The view compensation determiner may include: a difference average calculator calculating a left average value of differences between the numbers of bits occurring in the frames of the first non-referenced view video group and the number of bits occurring in the left reference view frame and a right average value of differences between the numbers of bits occurring in the frames of the first non-referenced view video group and the number of bits occurring in the right reference view frame; a bit number difference calculator calculating a left bit number difference between the number of bits occurring in each of the frames and the number of bits occurring in the left reference view frame or a right bit number difference between the number of bits occurring in each of the frames and the number of bits occurring in the right reference view frame; and a view determiner determining the view compensation pattern of each of the frames as the view compensation pattern of one of the bidirectional view compensation and the unidirectional view compensation based on a result of comparison between the number of bits occurring in each of the frames and the average number of bits, a result of comparison between the left bit number difference and the right bit number difference, a result of comparison between the left bit number difference and the left average value, and a result of comparison between the right bit difference and the right average value.

The multiview video coding method and device according to the present disclosure has the following effects:

First, the multiview video coding method and device according to the present disclosure can code non-referenced view video groups at a high coding rate without deteriorating image quality by determining a view compensation pattern and a parallelization view pattern based on video characteristics, such as the number of bits occurring in each of frames of a non-referenced view video group, the difference between the number of bits of each of the frames of the non-referenced view video group and the number of bits of the left reference view image, the difference between the number of bits of each of the frames of the non-referenced view video group and the number of bits of the right reference view image.

Second, the multiview video coding method and device according to the present disclosure is focused on the concept that the video characteristics of a successive non-referenced view video group input in succession to the non-referenced view video group are similar to those of the non-referenced view video group. It is therefore possible to code the successive non-referenced view video according to a view compensation pattern and a parallelization pattern of the non-referenced view video group, thereby reducing the amount of coding calculations.

Third, the multiview video coding method and device according to the present disclosure can update the non-referenced view video group with the successive non-referenced view video group based on the number of bits occurring in a first input frame of the successive non-referenced view video group. It is therefore possible to monitor video images having significant changes, thereby accurately determining a view compensation pattern and a parallelization view pattern.

The methods and apparatuses of the present disclosure have other features and advantages that will be apparent from, or are set forth in greater detail in the accompanying drawings, which are incorporated herein, and in the following Detailed Description of the Invention, which together serve to explain certain principles of the present disclosure.

DETAILED DESCRIPTION

Reference will now be made in detail to a multiview video coding method and device according to exemplary embodiments in conjunction with the accompanying drawings.

Figure 1:
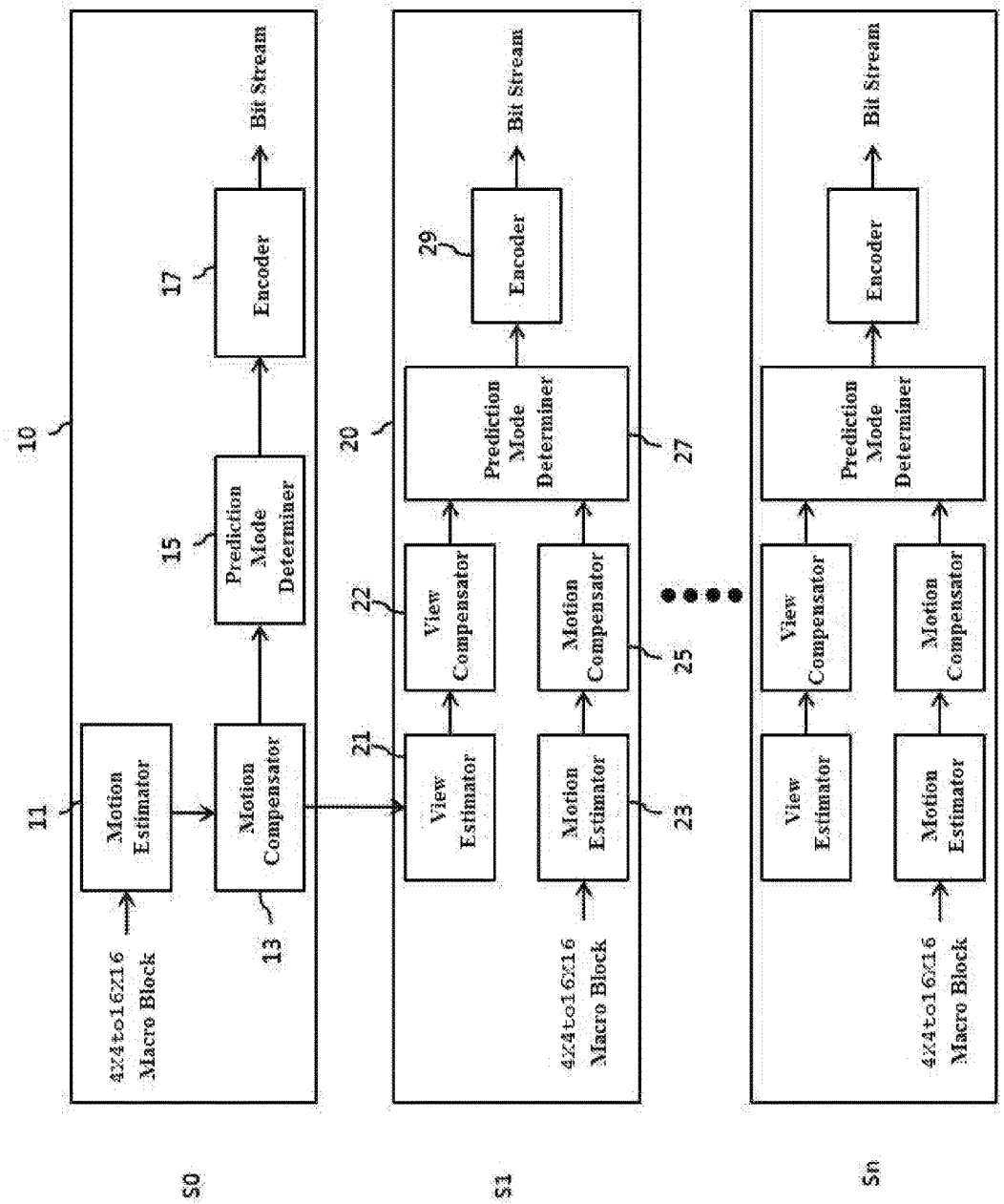
FIG. 1 is a functional block diagram illustrating a typical multiview video compression coding method of the related art.
Figure 2:
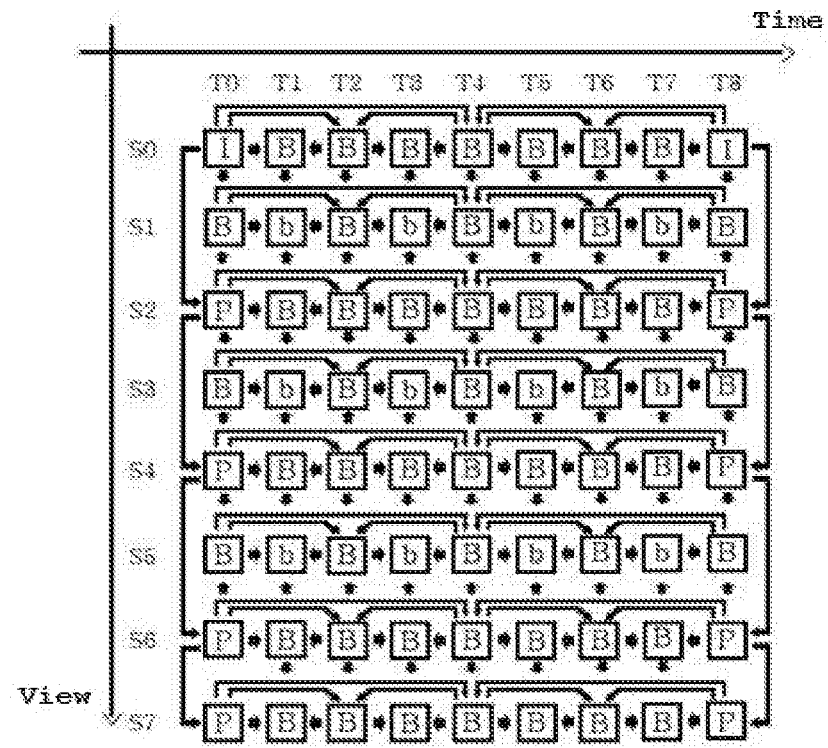
FIG. 2 illustrates an example of the GoGOP of the hierarchical B picture structure.
Figure 3:
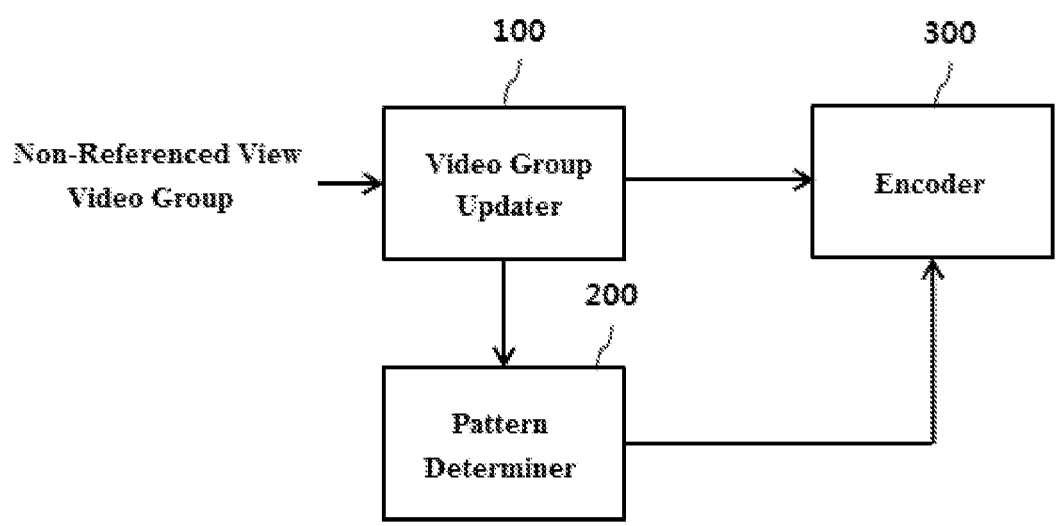
FIG. 3 is a functional block diagram illustrating a multiview video coding device according to an exemplary embodiment.

FIG. 3 is a functional block diagram illustrating a multiview video coding device according to an exemplary embodiment.

Referring to FIG. 3, in the multiview video coding device, a pattern determiner 200 determines a parallelization view pattern and a view compensation pattern based on the image characteristics of frames of a first non-referenced view video group among successively-input non-referenced view video groups in multiview video. When the parallelization view pattern and the view compensation pattern of the first non-referenced view video group are determined by the pattern determiner 200, an encoder 300 codes a successive non-referenced view video group input in succession to the first non-referenced view video group by performing parallelization and view compensation on the successive non-referenced view video group in the same manner as the parallelization view pattern and the view compensation pattern determined by the pattern determiner 200.

Here, the non-referenced view video group is a hierarchical B picture (frame) structure.

After the parallelization pattern and the view compensation pattern of the first non-referenced view video group are determined, when a successive non-referenced view video group is input in succession to the first non-referenced view video group, a video group updater 100 determines whether or not to update the first non-referenced view video group with the successive non-referenced view video group based on the number of bits occurring in a first frame of the successive non-referenced view video group. When the video group updater 100 determines to update the first non-referenced view video group with the successive non-referenced view video group, the pattern determiner 200 redetermines and updates the parallelization view pattern and the view compensation pattern from each frame of the successive non-reference view video group, and the encoder 300 codes a non-referenced view video group input in succession to the successive non-referenced view vide group with the parallelization view pattern and the view compensation pattern updated by the pattern determiner 200.

It is preferable that the video group updater 100 calculate a balanced number of bits by balancing the number of bits occurring in a first input frame of the first non-referenced view video group and the number of bits occurring in a first input frame of the successive non-referenced view video group. When the balanced number of bits is greater than a balance threshold, the first non-referenced view video group is updated with the successive non-referenced view video group.

Figure 4:
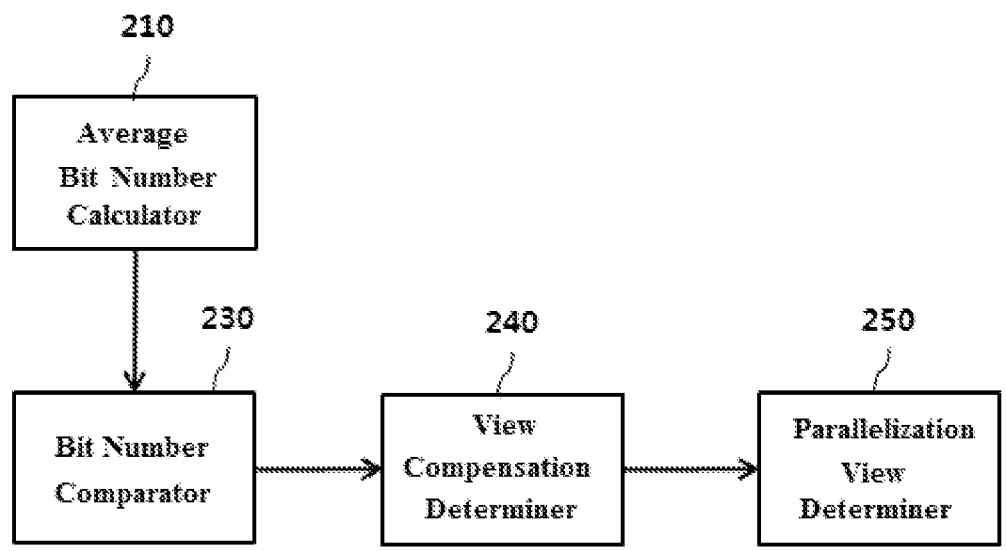
FIG. 4 is a functional block diagram illustrating an exemplary pattern determiner of the multiview video coding device.

FIG. 4 is a functional block diagram illustrating an exemplary pattern determiner 200 of the multiview video coding device.

Referring to FIG. 4, when non-reference view video groups among multiview video are successively input, an average bit number calculator 210 calculates the average number of bits occurring in the first non-referenced view video group. Here, each of the non-referenced view video groups consists of a plurality of frames (pictures), and the non-referenced view video groups are successively input in the unit of each group. The average number of bits occurring in the frames of the first non-referenced view video group among the non-referenced view video groups is calculated. Here, the number of bits occurring means the number of bits occurring when each of the frames of the non-referenced view video groups is subjected to view compensation, in particular, bidirectional view compensation.

A bit number comparator 220 determines which one of the number of bits occurring in each of the frames of the first non-referenced view video group and the average number of bits of the first non-referenced view video group is greater by comparing the number of bits occurring in each of the frames of the first non-referenced view video group and the average number of bits of the first non-referenced view video group.

A view compensation determiner 230 determines a view compensation pattern of each frame based on the result of the comparison by the bit number comparator 220. When the number of bits occurring in the frame is greater than the average number of bits of the first non-referenced view video group, the view compensation pattern of the frame is determined as a bidirectional view compensation pattern. When the number of bits occurring in the frame is smaller than the average number of bits of the first non-referenced view video group, the view compensation pattern of the frame is determined as one of a bidirectional view compensation pattern and a unidirectional view compensation pattern.

When the number of bits occurring in the frame is smaller than the average number of bits of the first non-referenced view video group, the view compensation determiner 230 determines the view compensation pattern as one of the bidirectional view compensation pattern and the unidirectional view compensation pattern, based on a difference in the number of bits between a frame and a left reference view frame, a difference in the number of bits between the frame and a right reference view frame, a left average value of the differences between the numbers of bits occurring in the frames of the first non-referenced view video group and the number of bits occurring in the left reference view frame, and a right average value of the differences between the numbers of bits occurring in the frames of the first non-referenced view video group and the number of bits occurring in the right reference view frame. When the view compensation pattern is determined as the unidirectional view compensation pattern, the view compensation determiner 230 redetermines view compensation as one of the left reference view frame or the right reference view frame.

A parallelization view determiner 240 determines a parallelization view pattern of each frame as one of a left reference view and a right reference view, based on the difference in the number of bits between each frame and the left reference view frame thereof and the difference in the number of bits between each frame and the right reference view frame thereof. When the view compensation pattern of the frame is determined as the unidirectional view compensation pattern by the view compensation determiner 230, the parallelization view determiner 240 determines the parallelization view pattern with a reference view frame the same as the determined reference view frame.

Figure 5:
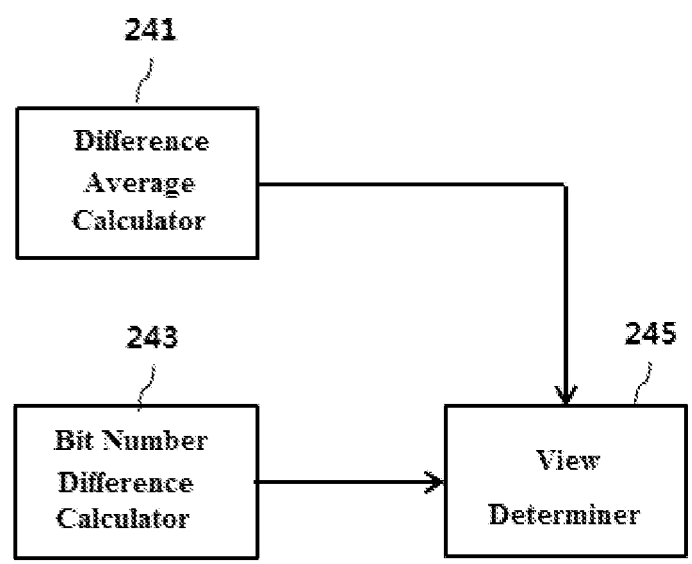
FIG. 5 is a functional block diagram illustrating an exemplary view compensation determiner of the pattern determiner of the multiview video coding device.

FIG. 5 is a functional block diagram illustrating an exemplary view compensation determiner 240 of the pattern determiner 200 of the multiview video coding device.

Referring to FIG. 5, a difference average calculator 241 calculates a left average value $db\_{AVGL0}$ of the differences between the numbers of bits occurring in the frames of the first non-referenced view video group and the number of bits occurring in the left reference view frame and a right average value $db\_{AVGL1}$ of the differences between the numbers of bits occurring in the frames of the first non-referenced view video group and the number of bits occurring in the right reference view frame.

A bit number difference calculator 243 calculates a left bit number difference $db_{L0}$, i.e. a difference in the number of bits between each of the frames of the first non-referenced view video group and a left reference view frame, a right bit number difference $db_{L1}$, i.e. a difference in the number of bits between each of the frames of the first non-referenced view video group and a right reference view frame.

A view determiner 245 determines the view compensation pattern of each of the frames of the first non-referenced view video group as one of the bidirectional view compensation pattern and the unidirectional view compensation pattern, based on the result of the comparison between the number of bits occurring in each of the frames and the average number of bits, the result of the comparison between the left bit number difference and the right bit number difference, the result of the comparison between the left bit number difference and the left average value, and the result of the comparison between the right bit number difference and the right average value.

Figure 6:
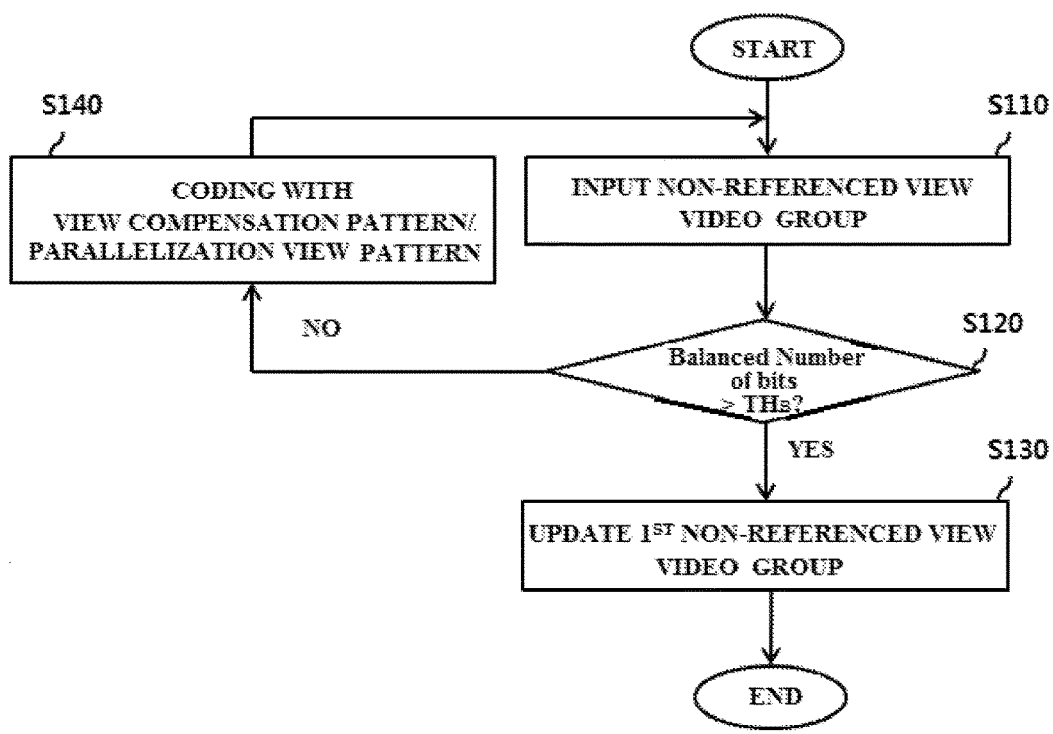
FIG. 6 is a flowchart illustrating a multiview video coding method according to an exemplary embodiment.

FIG. 6 is a flowchart illustrating a multiview video coding method according to an exemplary embodiment.

Referring to FIG. 6, in S110, non-referenced multiview video groups of multiview video are successively input. A first non-referenced view video group among the non-referenced multiview video groups is input, and a successive non-referenced view video group is input in succession to the first non-referenced view video group.

In S120, it is determined whether or not to update the first non-referenced view video group with the successive non-referenced view video group based on the video characteristic of the first input frame of the successive non-referenced view video group, i.e. the number of bits of the first frame. A balanced number of bits is calculated by balancing the number of bits occurring in a first input frame of the first non-referenced view video group and the number of bits occurring in a first input frame of the successive non-referenced view video group, and is determined whether or not to be greater than a balance threshold. When the balanced number of bits is smaller than the balance threshold, S140 is performed. In S140, it is determined that there is no significant change in the video between the successive non-referenced view video group and the first non-referenced view video group, and the successive non-referenced view video group is coded by setting the parallelization view pattern and the view compensation pattern of each of the frames of the successive non-referenced view video group to be identical to the parallelization view pattern and the view compensation pattern of the corresponding frame of the first non-referenced view video group.

In contrast, when the balanced number of bits is greater than the balance threshold, S130 is performed. In S130, it is determined that there is a significant change in video images between the successive non-referenced view video group and the first non-referenced view video group, and the first non-referenced view video group is updated with the successive non-referenced view video group.

When first non-referenced view video group is updated with the successive non-referenced view video group, the parallelization view pattern and the view compensation pattern of each of the frames of the successive non-referenced view video group are redetermined, and coding is performed on the successive non-referenced view video group and a non-referenced view video group input in succession to the successive non-referenced view video group using the redetermined parallelization view pattern and the redetermined view compensation pattern.

Figure 7:
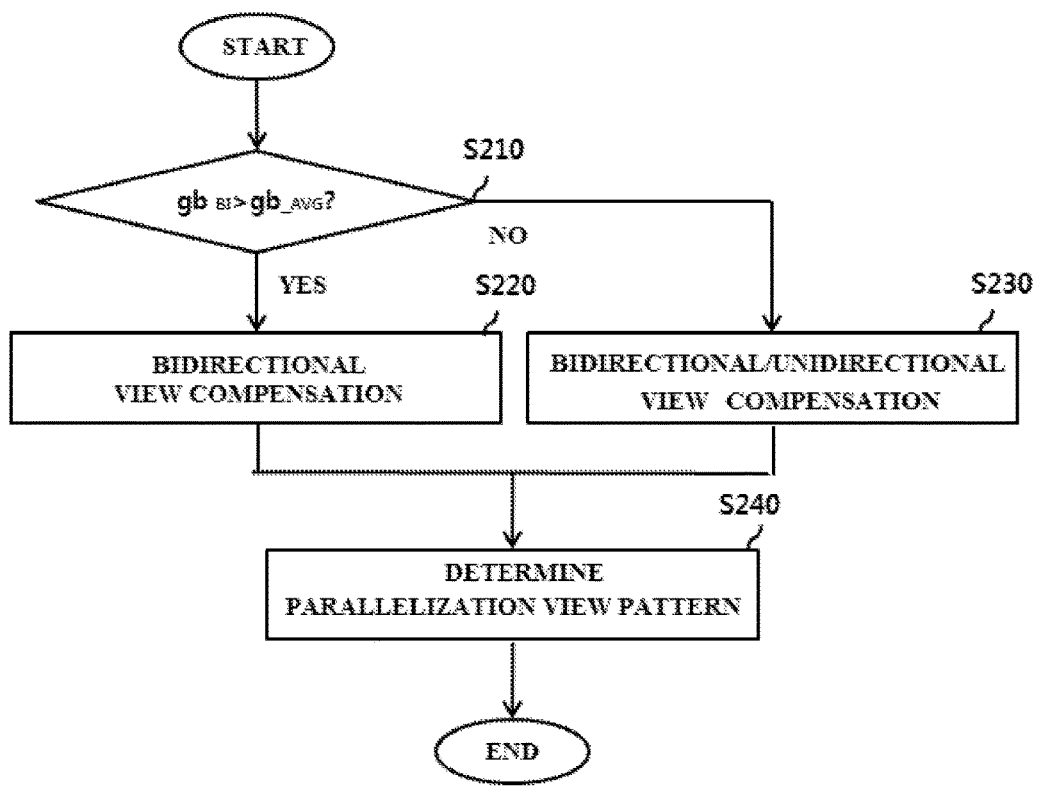
FIG. 7 is a flowchart illustrating an exemplary method of determining a parallelization view pattern and a view compensation pattern of non-referenced view video.

FIG. 7 is a flowchart illustrating an exemplary method of determining a parallelization view pattern and a view compensation pattern of non-referenced view video.

Referring to FIG. 7, in S210, the number of bits $gb\_{BI}$ occurring in each of the frames of the first non-referenced view video group among successively-input non-referenced view video groups is compared with the average number of bits $gb\_{AVG}$ of the first non-referenced view video group. Here, the number of bits occurring in each of the frames is the number of bits occurring when each of the frames of the first non-referenced view video group is coded with the bidirectional view compensation, and the average number of bits is the average number of bits occurring in the frames of the first non-referenced view video group.

Figure 8:
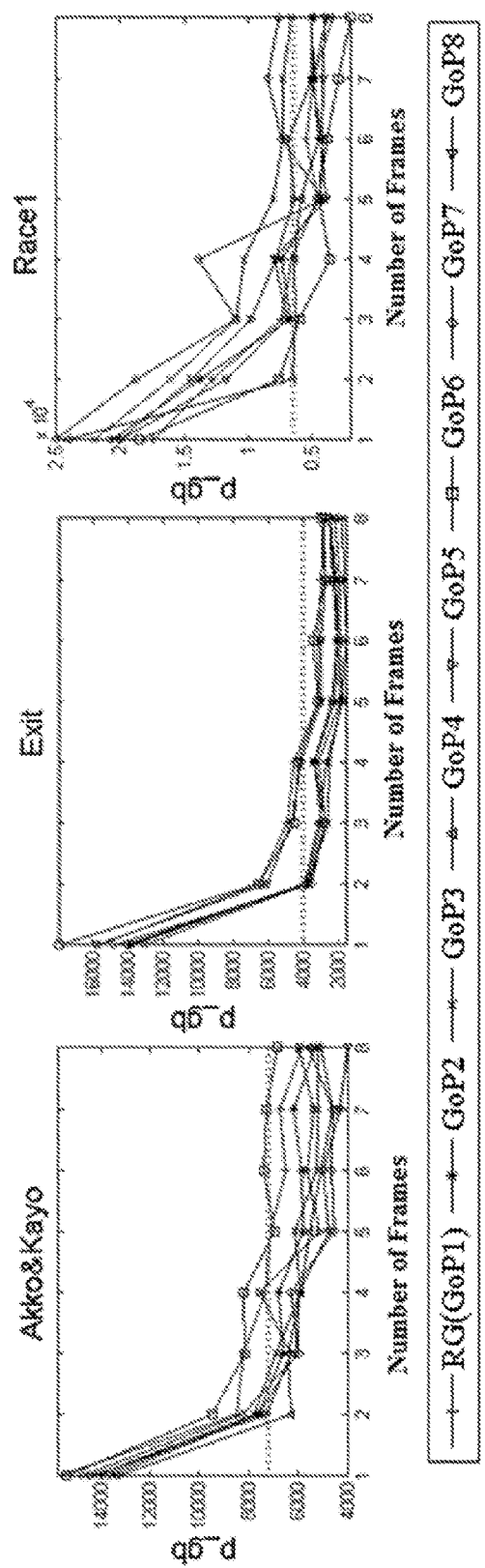
FIG. 8 illustrates examples of the number of bits and the average number of bits occurring in images "Akko&Kayo," "Exit," and "Race1;"

FIG. 8 illustrates examples of the number of bits and the average number of bits (dotted lines) occurring in images "Akko&Kayo," "Exit," and "Race1." As illustrated in FIG. 8, it is apparent that a large number of bits occurs in a first frame in non-reference view video groups GoP1 to GoP2 that are successively input. It is possible to accurately determine the average number of bits by excluding the first frame from the non-referenced view video groups.

Thus, it is preferable that the average number of bits occurring in the first non-referenced view video group is calculated as the average number of bits obtained by performing bidirectional view compensation on the remaining frames of the first non-referenced view video group except for the first, anchor frame.

Returning to FIG. 7, the number of bits occurring in each of the frames of the first non-referenced view video group is compared with the average number of bits occurring in the first non-referenced view video group, and when the number of bits of each frame is greater than the average number of bits, the compensation view pattern of the corresponding frame is determined as the bidirectional view compensation pattern in S220.

In contrast, when the number of bits of each frame is not greater than the average number of bits, the compensation view pattern of the corresponding frame is determined as one of the bidirectional view compensation pattern and the unidirectional view compensation pattern in S230.

In S240, the parallelization view pattern of each of the frames is determined as one of a left reference view and a right reference view, based on a difference in the number of bits between each frame and a left reference view frame, a difference in the number of bits between each frame and a right reference view frame, and a reference view subjected to view compensation when the view compensation pattern is determined as the unidirectional view compensation pattern.

The method of determining the parallelization view pattern will be described in greater detail as follows: When the view compensation is determined as the bidirectional view compensation and the difference in the number of bits between each of the frames of the first non-referenced view video group and the left reference view frame is smaller than the difference in the number of bits between each of the frames of the first non-referenced view video group and the right reference view frame, the parallelization view pattern is determined as the left reference view. When the difference in the number of bits between each of the frames of the first non-referenced view video group and the left reference view frame is not smaller than the difference in the number of bits between each of the frames of the first non-referenced view video group and the right reference view frame, the parallelization view pattern is determined as the right reference view. When the view compensation pattern is determined as the unidirectional view compensation pattern, the parallelization view pattern is determined as a reference view that is identical to the reference view subjected to the view compensation.

Figure 9:
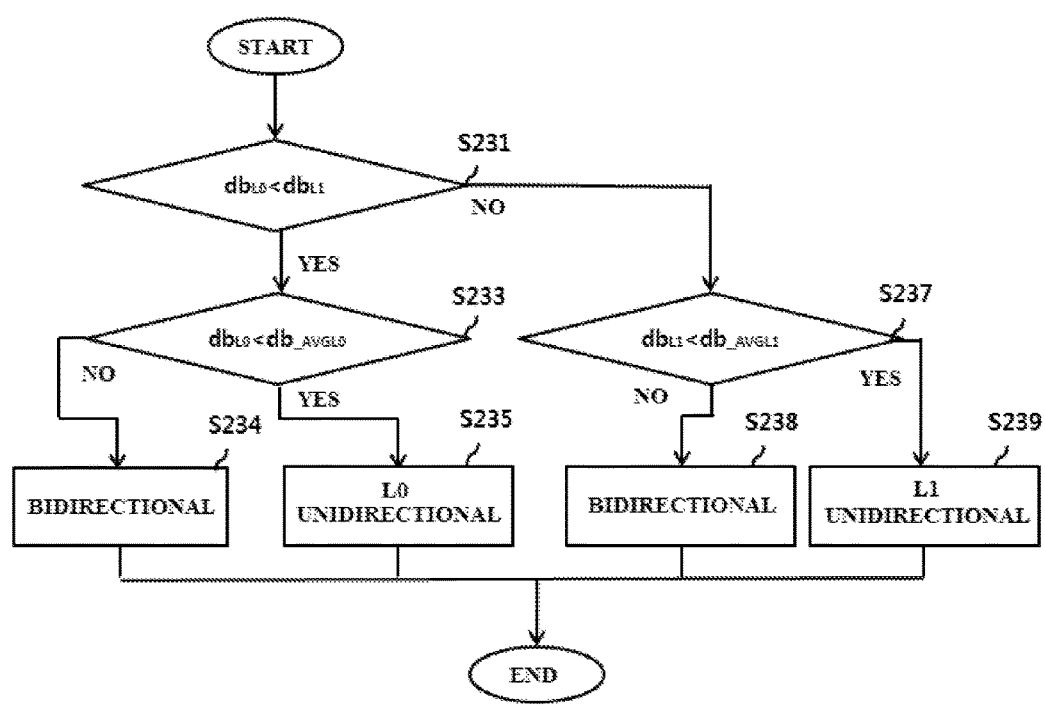
FIG. 9 is a flowchart illustrating an exemplary operation of determining a view compensation pattern.

FIG. 9 is a flowchart illustrating an exemplary operation of determining a view compensation pattern.

When the number of bits occurring in a frame is smaller than the average number of bits, the compensation view pattern of the frame is determined as one of the bidirectional view compensation pattern and the unidirectional view compensation pattern, which will be described in greater detail with reference to FIG. 9.

In S231, a left bit number difference $db_{L0}$, i.e. a difference in the number of bits between each of the frames of the first non-referenced view video group and a left reference view frame, is compared with a right bit number difference $db_{L1}$, i.e. a difference in the number of bits between each of the frames of the first non-referenced view video group and a right reference view frame. The left bit number difference $db_{L0}$ means the difference between the number of bits obtained by performing bidirectional view compensation on the frame and the number of bits obtained by performing view compensation on the left reference view frame. In addition, the right bit number difference $db_{L1}$ means the difference between the number of bits obtained by performing bidirectional view compensation on the frame and the number of bits obtained by performing view compensation on the right reference view frame.

When the left bit number difference $db_{L0}$ between the frame and the left reference frame is smaller than the right bit number difference $db_{L1}$ between the frame and the right reference frame, the left bit number difference $db_{L0}$ between the frame and the left reference frame is compared with a left average value $db\_{AVGL0}$ of the differences between the numbers of bits occurring in the frames of the first non-referenced view video group and the number of bits occurring in the left reference view frame in S233. Here, the left average value $db\_{AVGL0}$ of the differences between the numbers of bits occurring in the frames of the first non-referenced view video group and the number of bits occurring in the left reference view frame is calculated as an average value of the differences in the number of bits obtained by performing bidirectional view compensation on the frames of the first non-referenced view video group and the number of bits obtained by performing view compensation on the left reference view frame.

Figure 10:
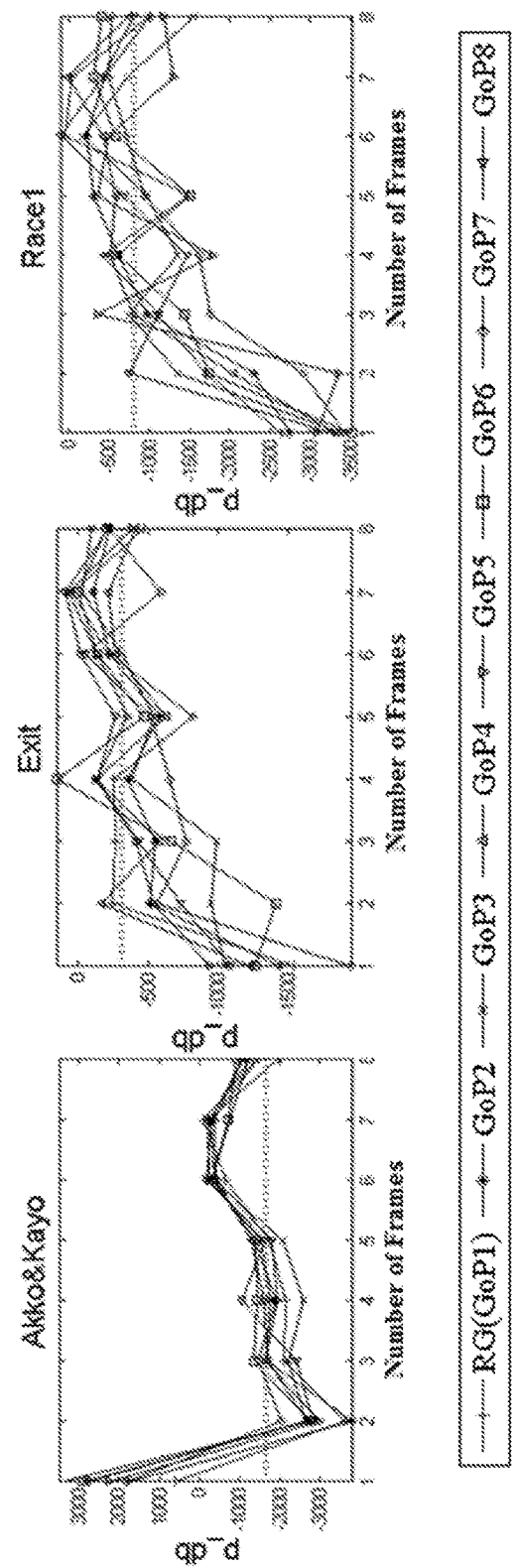
FIG. 10 illustrates examples of a left bit number difference $db_{L0}$, i.e. a difference in the number of bits between a frame and a left reference view frame, and a left average value $db\_{AVGL0}$ of the differences between the numbers of bits occurring in the frames of the first non-referenced view video group and the number of bits occurring in the left reference view frame in images "Akko&Kayo," "Exit," and "Race1."

FIG. 10 illustrates examples of a left bit number difference $db_{L0}$, i.e. a difference in the number of bits between a frame and a left reference view frame, and a left average value $db\_{AVGL0}$ of the differences between the numbers of bits occurring in the frames of the first non-referenced view video group and the number of bits occurring in the left reference view frame in images "Akko&Kayo," "Exit," and "Race1." As illustrated in FIG. 10, it is apparent that a large number of bits occurs in a first frame in non-reference view video groups GoP1 to GoP2 that are successively input. It is preferable that the left average value $db\_{AVGL0}$ of the differences between the numbers of bits occurring in the frames of the first non-referenced view video group and the number of bits occurring in the left reference view frame is calculated as an average value of the differences in the numbers of bits occurring in the remaining frames of the first non-referenced view video group except for the first, anchor frame.

Returning to FIG. 9, when the left bit number difference $db_{L0}$ between the frame and the left reference view frame is smaller than the left average value $db\_{AVGL0}$ of the differences between the numbers of bits occurring in the frames of the first non-referenced view video group and the number of bits occurring in the left reference view frame, the view compensation pattern is determined by setting the left reference view frame as the reference view frame of unidirectional view compensation in S235. In contrast, when the left bit number difference $db_{L0}$ between the frame and the left reference view frame is not smaller than the left average value $db\_{AVGL0}$ of the differences between the numbers of bits occurring in the frames of the first non-referenced view video group and the number of bits occurring in the left reference view frame, the view compensation pattern is determined as the bidirectional view compensation pattern in S234.

When the view compensation pattern is determined by setting the left reference view frame as the reference view frame of unidirectional view compensation, the parallelization view of the corresponding frame is selected to be the left reference view in the same manner.

In contrast, in the case in which the left bit number difference $db_{L0}$ between the frame and the left reference view frame is not smaller than the left average value $db\_{AVGL0}$ of the differences between the numbers of bits occurring in the frames of the first non-referenced view video group and the number of bits occurring in the left reference view frame and thus the view compensation pattern is determined as the bidirectional view compensation pattern, when the left bit number difference between the frame and the corresponding left reference view frame is smaller than the right bit number difference the frame and the corresponding right reference view frame, the parallelization view pattern is determined as the left reference view. When the left bit number difference between the frame and the corresponding left reference view frame is not smaller than the right bit number difference between the frame and the corresponding right reference view frame, the parallelization view pattern is determined as the right reference view.

In addition, when the left bit number difference $db_{L0}$ between the frame and the corresponding left reference view frame is not smaller than the right bit number difference $db_{L1}$ between the frame and the corresponding right reference view frame, the right bit number difference $db_{L1}$ between the frame and the corresponding right reference view frame is compared with the right average value $db\_{AVGL1}$ of the differences between the numbers of bits occurring in the frames of the first non-referenced view video group and the number of bits occurring in the right reference view frame in S237. Here, the right average value $db\_{AVGL1}$ of the differences between the numbers of bits occurring in the frames of the first non-referenced view video group and the number of bits occurring in the right reference view frame is calculated as an average value of the differences in the number of bits obtained by performing bidirectional view compensation on the frames of the first non-referenced view video group and the number of bits obtained by performing view compensation on the right reference view frame.

It is preferable that the right average value $db\_{AVGL1}$ of the differences between the numbers of bits occurring in the frames of the first non-referenced view video group and the number of bits occurring in the right reference view frame is calculated as an average value of the differences in the numbers of bits occurring in the remaining frames of the first non-referenced view video group except for the first, anchor frame.

When the right bit number difference $db_{L1}$ between the frame and the right reference frame is smaller than the right average value $db\_{AVGL1}$ of the differences between the numbers of bits occurring in the frames of the first non-referenced view video group and the number of bits occurring in the right reference view frame, the view compensation pattern is determined by setting the right reference view frame as the reference view frame of unidirectional view compensation in S239. When the right bit number difference $db_{L1}$ between the frame and the right reference frame is not smaller than the right average value $db\_{AVGL1}$ of the differences between the numbers of bits occurring in the frames of the first non-referenced view video group and the number of bits occurring in the right reference view frame, the view compensation pattern is determined as the bidirectional view compensation pattern in S238.

When the view compensation pattern is determined by setting the right reference view frame is determined as the reference view frame of unidirectional view compensation, the parallelization view of the corresponding frame is selected as the right reference view in the same manner.

In contrast, in the case in which the right bit number difference between the frame and the right reference view frame is not smaller than the right average value of the differences between the numbers of bits occurring in the frames of the first non-referenced view video group and the number of bits occurring in the right reference view frame and thus the view compensation pattern is determined as the bidirectional view compensation pattern, when the left bit number difference between the frame and the corresponding left reference view frame is smaller than the right bit number difference the frame and the corresponding right reference view frame, the parallelization view pattern is determined as the left reference view. When the left bit number difference between the frame and the corresponding left reference view frame is not smaller than the right bit number difference between the frame and the corresponding right reference view frame, the parallelization view pattern is determined as the right reference view.

The above-described embodiments of the present invention can be recorded as programs that can be executed by a computer, and can be realized in a general purpose computer that executes the program using a computer readable recording medium.

Examples of the computer readable recording medium include a magnetic storage medium (e.g. a floppy disk or a hard disk), an optical recording medium (e.g. a compact disc read only memory (CD-ROM) or a digital versatile disc (DVD)), and a carrier wave (e.g. transmission through the Internet).

While the present invention has been described with reference to the certain exemplary embodiments shown in the drawings, these embodiments are illustrative only. Rather, it will be understood by a person skilled in the art that various modifications and equivalent other embodiments may be made therefrom. Therefore, the true scope of the present invention shall be defined by the concept of the appended claims.

What is claimed is:

1. A multiview video coding method comprising:
   determining a parallelization view pattern and a view compensation pattern of each of frames of a first non-referenced view video group among successively-input non-referenced view video groups of multiview video;
   coding a successive non-referenced view video group input in succession to the first non-referenced view video group by performing parallelization or view compensation on the successive non-referenced view video group according to the determined parallelization view pattern and the determined view compensation pattern; and
   before coding the successive non-referenced view video group, determining whether or not to update the first non-referenced view video group with the successive non-referenced view video group based on a number of bits occurring in a first frame of the successive non-referenced view video group,
   wherein, when the first non-referenced view video group is updated with the successive non-referenced view video group, the parallelization view pattern and the view compensation pattern of each of the frames of the first non-referenced view video group are determined as and are updated with a parallelization view pattern and a view compensation pattern of each of frames of the successive non-referenced view video group.

2. The multiview video coding method according to claim 1, wherein a balanced number of bits is obtained by balancing the number of bits occurring in the first input frame of the first non-referenced view video group and a number of bits occurring in a first input frame of the successive non-referenced view video group, and when the balanced number of bits is greater than a balance threshold, the first non-referenced view video group is updated with the successive non-referenced view video group.

3. A multiview video coding method comprising:
   determining a parallelization view pattern and a view compensation pattern of each of frames of a first non-referenced view video group among successively-input non-referenced view video groups of multiview video; and
   coding a successive non-referenced view video group input in succession to the first non-referenced view video group by performing parallelization or view compensation on the successive non-referenced view video group according to the determined parallelization view pattern and the determined view compensation pattern,
   wherein determining the parallelization view pattern and the view compensation pattern of the first non-referenced view video group comprises:
   comparing a number of bits occurring in each of frames of the first non-referenced view video group with an average number of bits occurring in the first non-referenced view video group;
   determining a view compensation pattern of each of the frames as a view compensation pattern of one of bidirectional view compensation and unidirectional view compensation based on a result of comparing the number of bits occurring in each of the frames with the average number of bits; and determining the parallelization view pattern of each of the frames as one of a left reference view and a right reference view based on a difference between the number of bits occurring in each of the frames and a number of bits occurring in a left reference view frame and a difference between the number of bits occurring in each of the frames and a number of bits occurring in a right reference view frame.

4. The multiview video coding method according to claim 3, wherein determining the view compensation pattern of the first non-referenced view video group comprises determining the view compensation pattern as the view compensation pattern of the bidirectional view compensation when the number of bits occurring in a frame of the frames of the first non-referenced view video group is greater than the average number of bits.

5. The multiview video coding method according to claim 4, wherein determining the view compensation pattern of the first non-referenced view video group comprises:

when the number of bits occurring in a frame of the frames of the first non-referenced view video group is not greater than the average number of bits, comparing the difference between the number of bits occurring in the frame and the number of bits occurring in the left reference view frame with the difference between the number of bits occurring in the frame and the number of bits occurring in the right reference view frame; and when the difference between the number of bits occurring in the frame and the number of bits occurring in the left reference view frame is smaller than the difference between the number of bits occurring in the frame and the number of bits occurring in the right reference view frame, comparing the difference between the number of bits occurring in the frame and the number of bits occurring in the left reference view frame with an average value of differences between the numbers of bits occurring in the frames of the first non-referenced view video group and the number of bits occurring in the left reference view frame, wherein, when the difference between the number of bits occurring in the frame and the number of bits occurring in the left reference view frame is smaller than the average value of differences between the numbers of bits occurring in the frames of the first non-referenced view video group and the number of bits occurring in the left reference view frame, the view compensation pattern is determined by setting the left reference view frame as a reference view frame of the unidirectional view compensation.

6. The multiview video coding method according to claim 5, wherein, when the difference between the number of bits occurring in the frame and the number of bits occurring in the left reference view frame is not smaller than the average value of differences between the numbers of bits occurring in the frames of the first non-referenced view video group and the number of bits occurring in the left reference view frame, the view compensation pattern is determined as the view compensation pattern of the bidirectional view compensation.

7. The multiview video coding method according to claim 5, wherein the average number of bits occurring in the first non-referenced view video group is calculated as an average number of bits obtained by performing the bidirectional view compensation on the frames of the first non-referenced view video group.

8. The multiview video coding method according to claim 7, wherein the average number of bits occurring in the first non-referenced view video group is calculated as an average number of bits obtained by performing the bidirectional view compensation on remaining frames of the first non-referenced view video group except for a first, anchor frame.

9. The multiview video coding method according to claim 4, wherein determining the view compensation pattern of the first non-referenced view video group comprises:

when the number of bits occurring in a frame of the frames of the first non-referenced view video group is not greater than the average number of bits, comparing the difference between the number of bits occurring in the frame and the number of bits occurring in the left reference view frame with the difference between the number of bits occurring in the frame and the number of bits occurring in the right reference view frame; and when the difference between the number of bits occurring in the frame and the number of bits occurring in the left reference view frame is not smaller than the difference between the number of bits occurring in the frame and the number of bits occurring in the right reference view frame, comparing the difference between the number of bits occurring in the frame and the number of bits occurring in the right reference view frame with an average value of differences between the numbers of bits occurring in the frames of the first non-referenced view video group and the number of bits occurring in the right reference view frame, wherein, when the difference between the number of bits occurring in the frame and the number of bits occurring in the right reference view frame is smaller than the average value of differences between the numbers of bits occurring in the frames of the first non-referenced view video group and the number of bits occurring in the right reference view frame, the view compensation pattern is determined by setting the right reference view frame as a reference view frame of the unidirectional view compensation.

10. The multiview video coding method according to claim 9, wherein, when the difference between the number of bits occurring in the frame and the number of bits occurring in the right reference view frame is not smaller than the average value of differences between the numbers of bits occurring in the frames of the first non-referenced view video group and the number of bits occurring in the right reference view frame, the view compensation pattern is determined as the view compensation pattern of the bidirectional view compensation.

11. The multiview video coding method according to claim 9, wherein the average number of bits occurring in the first non-referenced view video group is calculated as an average number of bits obtained by performing the bidirectional view compensation on the frames of the first non-referenced view video group.

12. The multiview video coding method according to claim 11, wherein the average number of bits occurring in the first non-referenced view video group is calculated as an average number of bits obtained by performing the bidirectional view compensation on remaining frames of the first non-referenced view video group except for a first, anchor frame.

13. A multiview video coding method comprising:

selecting a reference view and a non-referenced view from multiview video;

when non-referenced view video groups corresponding to the selected non-referenced view are successively input, determining a parallelization view pattern and a view compensation pattern of each of frames of a first non-referenced video group among the non-referenced view video groups;

coding a successive non-referenced view video group input in succession to the first non-referenced view video group by performing parallelization or view compensation on the successive non-referenced view video group according to the determined parallelization view pattern and the determined view compensation pattern; and before coding the successive non-referenced view video group, determining whether or not to update the first non-referenced view video group with the successive non-referenced view video group based on a number of bits occurring in a first frame of the successive non-referenced view video group, wherein, when the first non-referenced view video group is updated with the successive non-referenced view video group, the parallelization view pattern and the view compensation pattern of each of the frames of the first non-referenced view video group are determined as and are updated with a parallelization view pattern and a view compensation pattern of each of frames of the successive non-referenced view video group.

14. A multiview video coding device comprising:

a pattern determiner determining a parallelization view pattern and a view compensation pattern of each of frames of a first non-referenced view video group among successively-input non-referenced view video groups of multiview video;

an encoder coding a successive non-referenced view video group input in succession to the first non-referenced view video group by performing parallelization and view compensation on the successive non-referenced view video group according to the determined parallelization view pattern and the determined view compensation pattern; and a video group updater determining whether or not to update the first non-referenced view video group with the successive non-referenced view video group based on a number of bits occurring in a first frame of the successive non-referenced view video group, wherein, when the first non-referenced view video group is updated with the successive non-referenced view video group, the pattern determiner redetermines the parallelization view pattern and the view compensation pattern of each of the frames of the first non-referenced view video group.

15. The multiview video coding device according to claim 14, wherein the video group updater calculates a balanced number of bits by balancing a number of bits occurring in a first input frame of the first non-referenced view video group and a number of bits occurring in a first input frame of the successive non-referenced view video group, and when the balanced number of bits is greater than a balance threshold, the first non-referenced view video group is updated with the successive non-referenced view video group.

16. A multiview video coding device comprising:

a pattern determiner determining a parallelization view pattern and a view compensation pattern of each of frames of a first non-referenced view video group among successively-input non-referenced view video groups of multiview video; and an encoder coding a successive non-referenced view video group input in succession to the first non-referenced view video group by performing parallelization and view compensation on the successive non-referenced view video group according to the determined parallelization view pattern and the determined view compensation pattern, wherein the pattern determiner comprises:

an average bit number calculator calculating an average number of bits occurring in the frames of the first non-referenced view video group among the non-referenced view video groups;

a bit number comparator comparing the number of bits occurring in each of the frames of the first non-referenced view video group and the average number of bits occurring in the first non-referenced view video group;

a view compensation determiner determining a view compensation pattern of each of the frames as a view compensation pattern of one of bidirectional view compensation and unidirectional view compensation based on a result of comparison between the number of bits occurring in each of the frames and the average number of bits; and a parallelization view determiner determining the parallelization view pattern of each of the frames as one of left reference view and right reference view based on a difference between the number of bits occurring in each of the frames and a number of bits occurring in a left reference view frame and a difference between the number of bits occurring in each of the frames and a number of bits occurring in a right reference view frame.

17. The multiview video coding device according to claim 16, wherein the view compensation determiner comprises:

a difference average calculator calculating a left average value of differences between the numbers of bits occurring in the frames of the first non-referenced view video group and the number of bits occurring in the left reference view frame and a right average value of differences between the numbers of bits occurring in the frames of the first non-referenced view video group and the number of bits occurring in the right reference view frame;

a bit number difference calculator calculating a left bit number difference between the number of bits occurring in each of the frames and the number of bits occurring in the left reference view frame or a right bit number difference between the number of bits occurring in each of the frames and the number of bits occurring in the right reference view frame; and a view determiner determining the view compensation pattern of each of the frames as the view compensation pattern of one of the bidirectional view compensation and the unidirectional view compensation based on a result of comparison between the number of bits occurring in each of the frames and the average number of bits, a result of comparison between the left bit number difference and the right bit number difference, a result of comparison between the left bit number difference and the left average value, and a result of comparison between the right bit difference and the right average value.

* * * * *